United States Patent [19]

Lagoutte et al.

[11] Patent Number: 5,548,585
[45] Date of Patent: Aug. 20, 1996

[54] INTER-TERMINAL TELECOMMUNICATIONS NETWORK FOR THE TRANSMISSON OF DATA BY PACKETS

[75] Inventors: Pierre Lagoutte, Issy Les Moulineaux; Alain Blanchard, La Queue-Lez-Yvelines, both of France

[73] Assignee: Thomson-CSF, Paris, France

[21] Appl. No.: 493,857

[22] Filed: Jun. 23, 1995

Related U.S. Application Data

[63] Continuation of Ser. No. 237,992, May 4, 1994, abandoned.

[30] Foreign Application Priority Data

May 4, 1993 [FR] France ................................. 93 05289

[51] Int. Cl.$^6$ ................................................. H04J 3/02
[52] U.S. Cl. .............................................. 370/60; 370/94.1
[58] Field of Search .............................. 370/58.3, 54, 60, 370/60.1, 58.1, 58.2, 94.1, 13, 14, 16, 17; 340/825.03, 826, 827; 329/219, 220, 221

[56] References Cited

U.S. PATENT DOCUMENTS

| | | | |
|---|---|---|---|
| 4,424,417 | 1/1984 | Chavey et al. | |
| 4,785,464 | 11/1988 | Judeinstein et al. | |
| 4,844,264 | 11/1989 | Servel et al. | 370/60 |
| 4,999,835 | 3/1991 | Lagoutte | |
| 5,117,429 | 5/1992 | Lagoutte | |
| 5,166,927 | 11/1992 | Iida et al. | 370/60 |
| 5,276,440 | 1/1994 | Jolissaint et al. | 370/60 |
| 5,319,639 | 6/1994 | Guha | 370/60 |
| 5,357,503 | 10/1994 | Montarges et al. | 370/58.3 |

OTHER PUBLICATIONS

Bar–Noy, Amotz, et al. "Topology Distribution Cost vs. Efficient Routing in Large Networks", Computer Communication Review, vol. 20, No. 4, Sep. 1990, New York, pp. 242–252.

Orda, Ariel, et al. "Location of Central Nodes in Time Varying Computer Networks", IEEE Infocom, Apr. 23, 1989, vol. 1, pp. 193–199.

Schroeder, Micheal D., "Autonet: A High–Speed, Self–Configuring Local Area Network Using Point–to Point Links", IEEE Journal On Selected Areas In Communications, vol. 9, No. 8, Oct. 1991, New York, pp. 1318–1335.

Lee, Kyoo J., et al. "Distributed Routing Using Topology Database In Large Computer Networks", IEEE Infocom, Mar. 27, 1988, New Orleans, pp. 593–602.

Borgonovo, Flaminio, et al., "Packet–Switching Network Architectures for Very–High–Speed Services", Proceedings 1990 International Zurich Seminar On Digital Communications; Electronic Circuits And Systems For Communication, Mar. 5, 1990, Zurich, pp. 336–351.

Primary Examiner—Wellington Chin
Assistant Examiner—Huy D. Vu
Attorney, Agent, or Firm—Oblon, Spivak, McClelland, Maier & Neustadt, P.C.

[57] ABSTRACT

An inter-terminal telecommunications network for the transmission of data by packets includes a transport layer formed by switching micronodes connected to one another by lines. The transport layer is adapted to enable the communication and conveyance of packets or cells of data elements, on the one hand among units of equipment of the network and, on the other hand, between the network and other units of equipment external to the network. Each micronode is controlled by means of instructions contained in each cell header that is presented to it on a line of the network to enable the routing of the cell on another line of the network and the transmission of the number and of the states of the neighboring micronodes towards a unit of a centralized management layer so as to keep the management layer constantly informed about the configuration of the network.

3 Claims, 2 Drawing Sheets

INTER-TERMINAL TELECOMMUNICATIONS NETWORK FOR THE TRANSMISSON OF DATA BY PACKETS

This application is a Continuation of application Ser. No. 08/237,992, filed on May 4, 1994, now abandoned.

BACKGROUND OF THE INVENTION

1. Field of the Invention

The present invention relates to an inter-terminal telecommunications network for the transmission of data by packets.

It can be applied notably to the making of local area networks for communications among business firms.

Local area networks are naturally designed to link users with the switched telephone network as well as to put microcomputer stations into communication with one another or with external data-processing systems by means of a data service center.

2. Description of the Prior Art

An inter-terminal telecommunications network is formed in a standard way by a set of transmission nodes connected to one another by lines on which there flow information elements of the network transmitted by transmission stations.

The installation of small-sized local area networks within one and the same office, for example, does not raise major difficulties. By contrast, once the network starts covering larger units such as a whole building or a set of buildings, all sorts of difficulties appear, notably in the management of the configuration of the network which must take the development of the network components into account, and in running and maintenance which require that the defective elements of the network should be known at all times so that the routing of the information elements is not interrupted.

These constraints lead to rigid configurations that are ill-suited to the development of services and of the terminals. These rigid configurations, ultimately, are not satisfactory for the users who would like their automated office configuration to be permanently open-ended in order to benefit from the new advantages offered by the development of technologies, and who would like their investments to yield returns for economically acceptable lengths of time.

The aim of the invention is to overcome the above-mentioned drawbacks.

SUMMARY OF THE INVENTION

To this end, an object of the invention is an inter-terminal telecommunications network for the transmission of data by packets, of the type comprising a transport layer formed by switching micronodes connected to one another by lines, the transport layer being adapted to enable the communication and conveyance of packets or cells of data elements, on the one hand among units of equipment of the network, and, on the other hand, between the network and other units of equipment external to the network, wherein each micronode is controlled by means of instructions contained in each cell header that is presented to it on a line of the network to enable the routing of the cell on another line of the network and the transmission of the number and of the states of the neighboring micronodes towards a unit of a centralized management layer so as to keep the management layer constantly informed about the configuration of the network.

The main advantage of the inter-terminal telecommunications network according to the invention is that it always provides switching that is adapted to the architecture of the transmission, whatever the way in which it develops in terms of the number of users to be served, achieving this result notably by means of the splitting up of the switching and intelligence functions within the network. Through this architecture, the units of the management layer are capable, at all times, of knowing the topology of the network and of monitoring it efficiently. Another advantage results in the control and monitoring of the switching function which may be thus be obtained by means of a protocol of supervision between the control of each switching micronode by means of a set of very limited switching instructions which gives a realistic implementation of the software. Consequently, the cost of the elementary switching point is drastically reduced as compared with known prior art switches and plays only a marginal role in the overall budget of the transmission function. Finally, the management layer makes it easy to check for coherence in the collaboration between the switching micronodes.

BRIEF DESCRIPTION OF THE DRAWINGS

Other features and advantages of the invention will appear from the following description, which is made with reference to the appended figures, of which.

DETAILED DESCRIPTION OF THE PREFERRED EMBODIMENT

Figure 1:
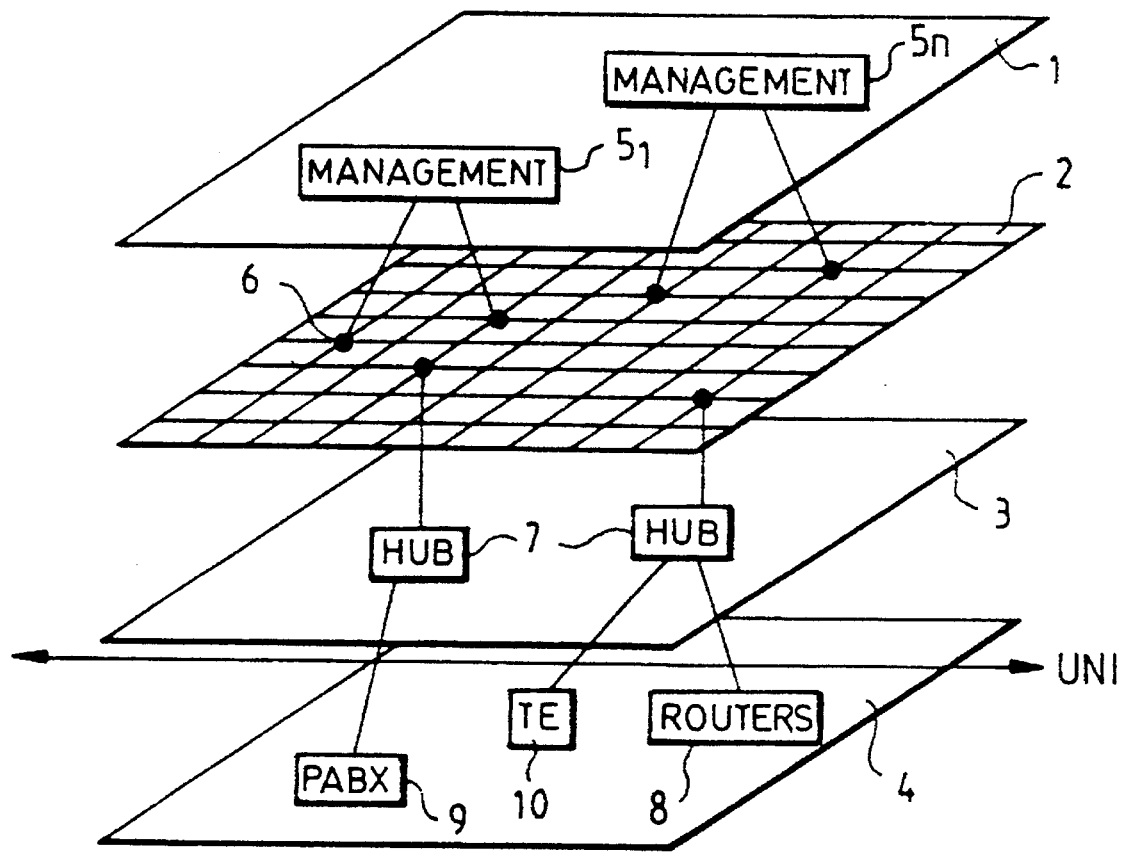
FIG. 1 shows a functional diagram of an inter-terminal telecommunications network according to the invention.

The telecommunications network shown in FIG. 1 has an architecture which, seen schematically, is constituted by four functional layers, namely a management layer 1, a transport layer 2, an access layer 3 and an equipment layer 4 served by the network.

Figure 2:
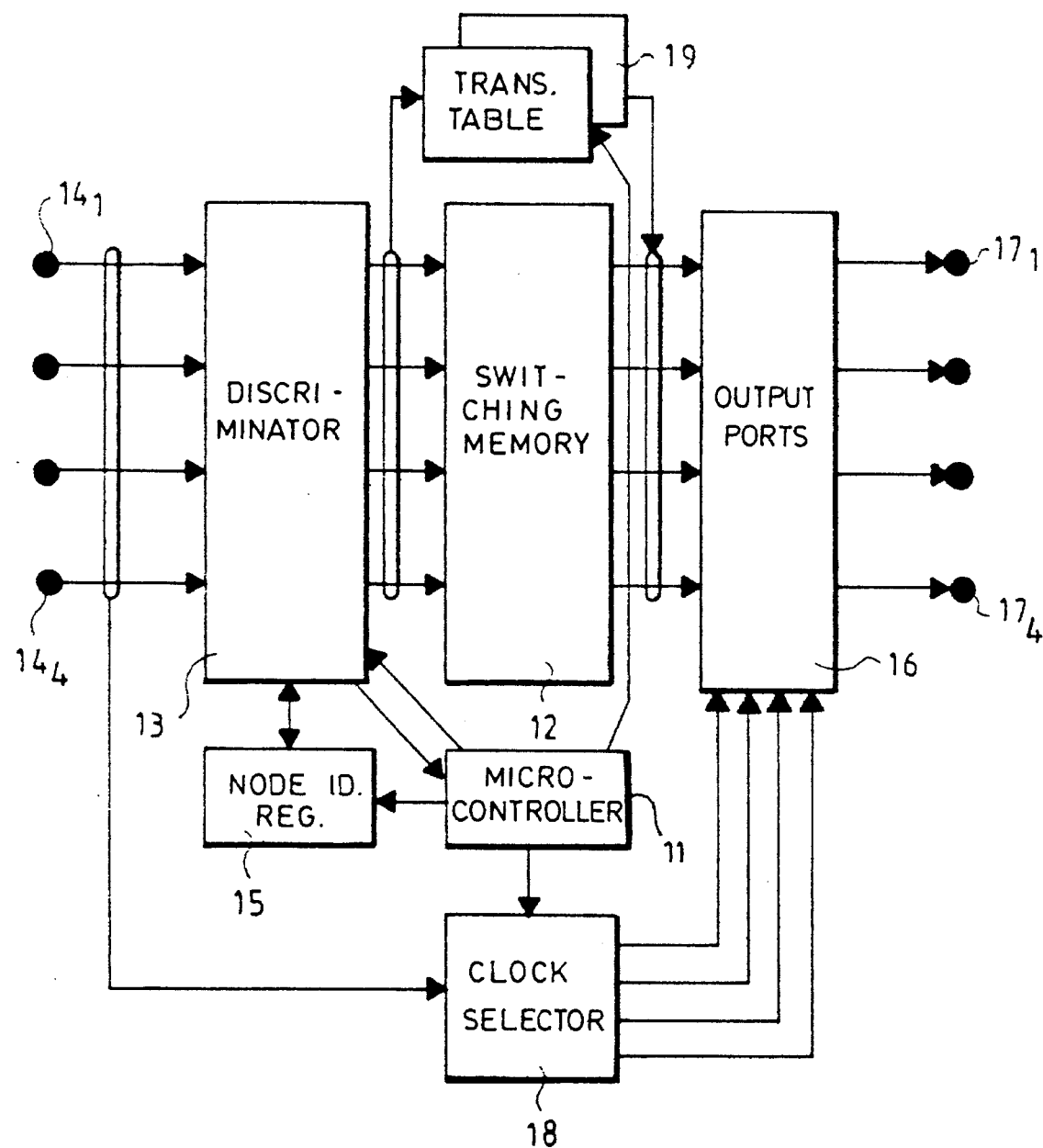
FIG. 2 shows an embodiment of a distribution node comprising the network of FIG. 1.

The management layer 1 is formed by a set of processing units $5_1$ to $5_n$ that are microprogrammed in order to control the transport layer 2 and maintain the entire network in an operational condition. The transport layer 2 is constituted by a meshing of micronodes 6 through which there travels the flow of data elements from the users. These micronodes are supervised by the processing units $5_j$ of the management layer 1. The access layer 3 is formed by a set of hubs or interface circuits 7 designed, in a known way, to connect the units of equipment of the layer 4 to certain nodes 6 of the transport layer 2. The equipment of the layer 4 may consist of very different units of equipment, for example routers 8 or multiplexers 9 suited to the conveying of data elements or information elements to other networks of the ISDN (integrated services digital network) type commercially available under the brand name "TRANSPAC" or again for the conveying of information elements among terminals or automated office stations placed at the disposal of local users. Each micronode 6 is structured in the manner shown in FIG. 2 to manage two distinct arrays for the addressing of the data elements that go through it, the array of virtual circuits that delineate the route of the users' services and the array of micronodes that enable the supervision system to control the network of distributed micronodes. To do this, each micronode has the following elements organized around a microcontroller 11: a switching memory 12 addressed by a discriminator 13 connected in FIG. 2 to four incoming lines $14_1$ to $14_4$. It also has a register 15 for the identification of the node, a set of output ports 16 coupled between the data outputs of the switching memory 12 and a set of four outgoing lines $17_1$ to $17_4$.

A clock selection circuit 18, working under the control of the microcontroller 11, selects the clock signals applied to the incoming lines $14_1$ to $14_4$ in order to apply them to the outgoing lines $17_1$ to $17_4$ by means of the output ports 16. A translation table stored in a memory 19 works together with the microcontroller 11 to decode instructions given to the micronode.

This architecture enables each processing unit $5_j$ of the management layer to maintain, in each node of the network, a set of virtual connections between itself and each of the nodes as well as a tree for the tracing back of reports and alarms coming from the nodes, each micronode 6 being capable of managing its neighborhood through a possibility provided to it of giving a command to one of its topological neighbors and sending out a report to one of the processing units of the management layer 1.

Figure 3:
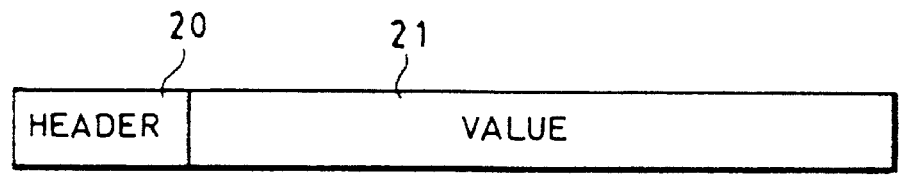
FIG. 3 shows the constitution of a cell of transmitted information elements.

To understand the way in which the data received at the incoming lines $14_1$ to $14_n$ is transferred into the switching memory 12 through the discriminator 13, it may be noted that each cell of data elements forming a packet transmitted in the network is formed, as shown in FIG. 3, by a header 20 and a zone of values 21. Depending on the type of header, the discriminator 13 routes the cell either to the outgoing line indicated by the zone 21 or towards another micronode, or again it may carry out the instructions in the information elements contained in its payload not shown in FIG. 3. Thus, depending on the instructions that come from the discriminator 13, the microcontroller may connect or disconnect the virtual circuits, learn to control and test adjacent connection links and constitute a tree for the distribution of the clock rate to each line. It may also monitor the state of the lines and get initialized by itself when it is cut off from the management layer. This may be the case, for example, when the connected line becomes unavailable for more than a specified number of seconds prompting a loss of its identity in the micronode. In this case, the microcontroller is programmed to deactivate the transfer of the incoming cells towards the outgoing lines and set adjacent microcontrollers and nodes by an instruction so as to make them identify their available status along the identity lines. All the actions described here above may be controlled according to the invention, for example by means of the following set of instructions:

| | |
|---|---|
| Mark Trans Vc: | <VC value>, <value> |
| Read Trans Vc: | <VC value> |
| Mark Trans-Node: | <Node value> <value> |
| Read Trans-Node: | <Node value> |
| Echo: | <Payload value> |
| Forward instruction: | <line> <remainder of payload> |
| Mark node Id: | <Id node value> |
| Switch VP/VC: | <value> |
| Connect linking clock: | <Id of outgoing link, Id of incoming link> |

In this set of instructions, the underlined part corresponds to the title of the instruction and the part within brackets is that contained in the value part of the cell.

The instruction "Trans VC" is aimed at marking the translator table VC.

The instruction "Read Trans VC" enables the reading of the translator table VC.

The instruction "Trans-Node" enables the value of the identity of the node to be marked in the identity register.

The instruction "read Trans-Node" enables the identity of the node to be read.

The instruction "echo" enables the cell to be sent back to the management layer.

The instruction entitled "forward instruction" enables the rest of the payload of the cell to be transmitted on a designated line.

The instruction "mark node Id" enables the identity register of the cell to be updated and set at the value indicated in the value zone.

The instruction entitled "switch VPC" marks the position of the field to be translated in the routing table.

Finally, the instruction "connect linking clock" enables the clock selector to be activated in order to distribute the input clock rate of the junction among the output clocks of the link. Naturally, to carry out these instructions, the addresses are generated by the discriminator 13 which extracts the commands delivered to the micronode and by the microcontroller 11 which is entrusted with carrying out the reduced set of micro-instructions, acknowledging the report and generating the spontaneous alarms.

What is claimed is:

1. An inter-terminal telecommunications network for transmitting data in packets, comprising:

a management layer having microprogrammed processing units;

an equipment layer having data processing equipment for conveying packets of data; and a transport layer having a plurality of interconnected transport lines and a micronode formed at each interconnection of said transport lines, said transport layer enabling communication of packets of data from said management layer to said equipment layer via an access layer interposed therebetween in accordance with information contained in cell headers of said packets of data received at each micronode from said microprogrammed processing units, and the communication of a status of each of said micronodes to said management layer, wherein each of said micronodes comprises a microcontroller coupled to a switching memory addressed by a discriminator, an identification register, and a set of input and output ports.

2. An inter-terminal telecommunications network according to claim 1, wherein each of said micronodes further comprises a clock selection circuit, coupled to said microcontroller and said input and output ports, for applying a clock signal to said input and output ports of each of said micronodes.

3. An inter-terminal telecommunications network for transmitting data in packets, comprising:

a management layer having microprogrammed processing units;

an equipment layer having data processing equipment for conveying packets of data; and a transport layer having a plurality of interconnected transport lines and a micronode formed at each interconnection of said transport lines, said transport layer enabling communication of packets of data from said management layer to said equipment layer via an access layer interposed therebetween in accordance with information contained in cell headers of said packets of data received at each micronode from said microprogrammed processing units, and the communication of a status of each of said micronodes to said management layer, each of said micronodes comprising a microcontroller for processing instructions contained in a packet header, connecting or disconnecting virtual circuits, and learning to control and testing adjacent connection links which constitute a tree for the distribution of the clock rate to each transport line, a discriminator coupled to the microcontroller for routing data depending on the type of header, and a translation table for decoding instructions given to the micronode.

* * * * *